Figure 1:
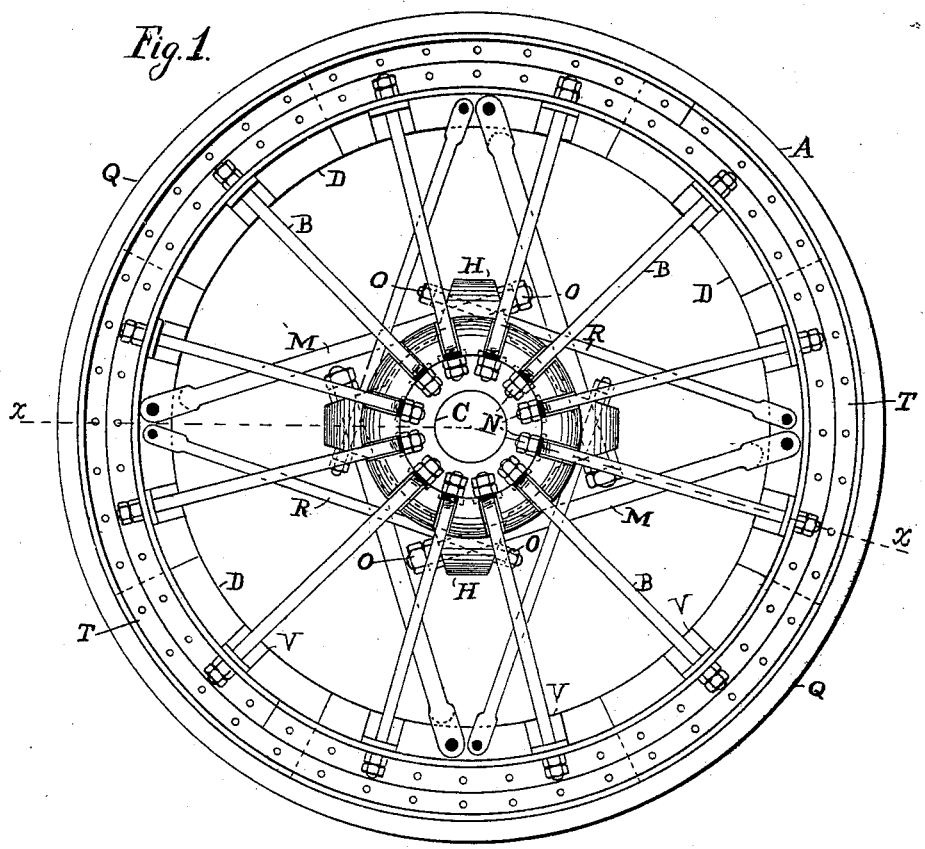

(No Model.)

E. S. COBB.
WHEEL.

No. 565,378. Patented Aug. 4, 1896.

WITNESSES:

INVENTOR:
Edward S Cobb
BY
John Richards
ATTORNEY.

THE NORRIS PETERS CO., PHOTO-LITHO., WASHINGTON, D. C.

UNITED STATES PATENT OFFICE.

EDWARD S. COBB, OF SAN FRANCISCO, CALIFORNIA.

WHEEL.

SPECIFICATION forming part of Letters Patent No. 565,378, dated August 4, 1896.

Application filed August 16, 1895. Serial No. 559,516. (No model.)

*To all whom it may concern:*

Be it known that I, EDWARD S. COBB, a citizen of the United States, and a resident of the city and county of San Francisco, State of California, have invented certain new and useful Improvements in Metallic Wheels; and I hereby declare the following specification and the drawings therewith to be a complete description of my invention and manner of applying the same.

My invention relates to the construction of composite or built-up wheels of metal, especially wheels of large diameter, for bands, ropes, tooth-gearing, water-wheels, fly-wheels, or other purposes in the transmission and application of power and motion.

My improvements consist in providing a series of centripetal members or spokes to resist centrifugal strain and maintain true rotundity of the rim, and in addition thereto separate members to transmit or resist radial turning strain, the latter so disposed as to represent girders or beams balanced across the axis of the wheel.

My improvements further consist in so arranging the various radial members and parts of such wheels that the whole will be in tension, adjustable, and of sections that can be made from fibrous material, such as wrought iron or steel, also to various constructive features that will be fully pointed out in the description and drawings.

The object of my invention is to reduce the amount of material required in such wheels to the lowest limit by the avoidance of compressive, transverse, and inherent strains, and to permit wheels to be constructed from fibrous metal bars of common section, to provide resistance against rupture and accident from excessive speed, also to provide a wheel in which the strain on the various members is direct and can be computed with certainty.

To these ends I construct wheels as shown in the drawings herewith, in which—

Figure 2:
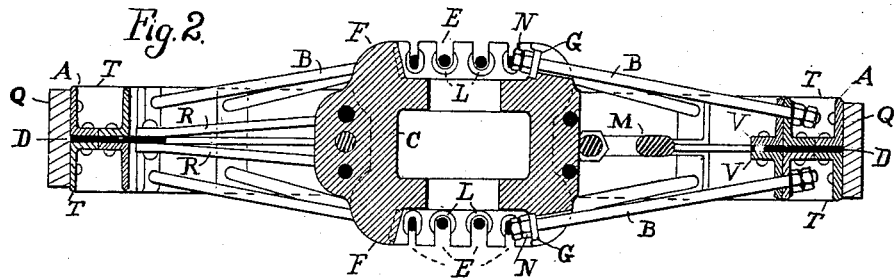

Figure 1 is a side elevation of a metallic wheel made according to my invention. Fig. 2 is a section through Fig. 1 on the line $x\,x$, similar letters of reference being employed to designate corresponding parts in the two figures.

In the use of large wheels subjected to high velocity of rotation, or to severe turning strains, or both, there is danger of rupture by reason of unknown inherent strains in castings when wheels are thus composed. Such strains may arise from irregular cooling of the castings, want of homogeneity in the material, and other causes, whether such wheels are whole or joined together in sections, the integrity and value of the parts not being computable with precision, so that an excess of dimensions and weight must be provided for that reason. If, however, a wheel is wholly composed of fibrous metal, the laminations of which are in the lines of strain, and the strength of which is determinable by experiment, or known by analogy, such a wheel can be made of assured strength and to contain the least amount of material consistent with the requirements of its use. Such determination of strength is especially exact when, as in the present case, the members of the wheel are not exposed to compound strains, such as centrifugal and radial, or longitudinal and transverse, that fall on the spokes of a common cast wheel, or any wheel in which the spokes perform different functions. It is to meet these conditions that my improvements are directed, as will now be explained.

The wheel, as may be seen, consists of four elements—a rim A, composed of angular and flat sections of wrought iron or steel; a nave or hub C, which can be of cast material; centripetal spokes B, and driving spokes or trusses composed of the members M and R. The rim A can be built up in any suitable manner and of sections of any form suitable to receive toothed segments, a flat face for a band, or a heavy rim to act as a fly-wheel. The central member D of the rim A, to which the spokes M and R are attached, can be continuous in one piece, or in segments, as shown, the latter construction being adopted to avoid the difficulty of making from wrought iron or steel a continuous ring of this kind for large wheels. The centripetal spokes B are set diagonally to the plane of the wheel in such a degree as will impart the required lateral stability to the rim A, dependent on the purpose to which the wheel is applied. The outer end of these spokes B can pass through the angular sections of the wheel-rim, as shown in the drawings, or can be attached in any secure manner thereto, also pass through the angle-plates V, that form a complete connection between the plate D and the angular members T of the rim A, also form strong braces to resist the tension of the spokes B.

The inner ends of the spokes B fit into slots E, formed in the extension F of the nave C, as seen in Fig. 2. This arrangement of the spokes B is to permit their insertion or removal while a wheel is in course of construction and after its completion.

To secure the spokes B from lateral displacement, I employ washers G, fitting into sunk recesses L, which makes their attachment perfectly secure so long as the nuts N are not removed.

Referring to the driving-spokes or truss-frames, composed of the members M and R, only one of them need be described, there being two sets of these, as seen in the drawings, identical in all respects. There are in the present case shown two of these members R for one chord, and a single one, M, for the other chord, the purpose being to dispose them perfectly parallel to the plane of rotation. If, however, they are set oblique to this plane a distance of one diameter where they pass through the lugs H, then the two chord members M and R can be of the same size and section. The lugs H, which receive or impart the turning force of the wheel or its shaft, are formed integrally with the nave C, having oblique holes and beveled faces to receive the nuts O, as seen in Fig. 1. The functions of these spokes or levers M and R, as will be seen, are wholly independent of the centripetal or rim-sustaining spokes B, and there is no interference in construction, the driving-spokes or trussed members being inclosed within the plane of the spokes B.

The outer rim Q, as seen in the drawings, does not form an essential part of the wheel, being shown to indicate a method of adding weight for a fly-wheel when made according to my invention. For tooth-gearing this rim Q would be replaced with segments riveted or bolted to the members T. For band-wheels a thin outer covering of greater width can be applied around the members T, but as these and other modifications of the outer rim do not form a part of my invention, and are well understood by those skilled in the construction of wheels, no further explanation is required here. The centripetal spokes B being adjustable by means of the nuts N, it is obvious that during construction and afterward the contour of the rim can be thus made truly cylindrical and concentric, also that by the aid of peening and varying the strain at the spokes B on the two sides the rim can be adjusted laterally, so as to revolve in a true plane. It will also be seen that the driving-spokes or truss-frames M can be adjusted in a like manner by means of the nuts O.

Having now explained the manner of constructing wheels according to my invention, it will be seen that all the members are in a state of tension, including the rim, when the rate of revolution is enough to set up centrifugal force in that member, also that there are no torsional, bending, or other strains on any of the members to induce rupture or deterioration of the material. It will also be seen that the value or coherent strength of all the various members except the nave C is definitely ascertainable and easily computed with any factor of safety that may be chosen.

What I claim as new, and desire to secure by Letters Patent, is—

1. In a metallic wheel, the combination of a series of tie-rods attached to the rim and the nave of the wheel, and the diagonal truss or driving rods also attached to the rim and nave of the wheel, and sustaining torsional or driving strain only, and acting independently of the aforesaid series of tie-rods, substantially as described.

2. In a wheel, the combination of a built-up rim composed of suitable sections, a turning truss-frame attached to said rim and to the nave of the wheel, and transmitting the torsional strain of the wheel or the shaft on which it is mounted, independently of the spokes or rim-sustaining members of the wheel, and the radial tie-rods to sustain the rim, substantially as described.

3. In a metallic wheel, a nave and rim, diagonal truss-rods connecting them and exerting a torsional strain in the manner described, and a series of radial tie-rods connecting the rim and nave of the wheel and adjustably attached to the latter, all arranged so that the strains may be equalized and the rims set cylindrical and concentric, substantially as described.

4. In a metallic wheel, a series of radial rim-sustaining spokes, subject to tensile strain only; independent truss spokes or frames to resist and impart torsional strains; a nave having slotted extensions at the sides to receive the rim-sustaining spokes, so these may be separately removed and replaced after a wheel is completed, in the manner and for the purposes substantially as described.

5. In a metallic wheel, a built-up rim, rim-sustaining spokes and driving-trusses, in the manner described, a nave adapted to receive the rim-sustaining spokes, and provided with lugs, to which the driving truss or trusses are attached by means of adjustable screw-nuts, in the manner substantially as described.

6. In a metallic wheel, a built-up rim, a central ring or plate, the driving members of the wheel attached thereto, a series of angle-plates attached to the central plate and the rim, and the rim-supporting spokes passing through perforations in said angle-plates, substantially as described.

In testimony whereof I have hereunto affixed my signature in the presence of two witnesses.

EDWARD S. COBB.

Witnesses:
ALFRED A. ENQUIST,
WILSON D. BENT, Jr.